(12) United States Patent
Riise (10) Patent No.: US 10,689,973 B2
(45) Date of Patent: Jun. 23, 2020

(54) DIMENSIONAL CHARACTERISTIC DETERMINATIONS OF A WELLBORE

(71) Applicant: HALLIBURTON ENERGY SERVICES, INC., Houston, TX (US)

(72) Inventor: Henrik Erevik Riise, Hafrsfjord (NO)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 303 days.

(21) Appl. No.: 15/318,628

(22) PCT Filed: Jul. 24, 2014

(86) PCT No.: PCT/US2014/048039
§ 371 (c)(1),
(2) Date: Dec. 13, 2016

(87) PCT Pub. No.: WO2016/014064
PCT Pub. Date: Jan. 28, 2016

(65) Prior Publication Data
US 2017/0130576 A1    May 11, 2017

(51) Int. Cl.
| | |
|---|---|
| *E21B 47/08* | (2012.01) |
| *E21B 7/06* | (2006.01) |
| *E21B 17/10* | (2006.01) |
| *G01B 5/12* | (2006.01) |

(52) U.S. Cl.
CPC .............. *E21B 47/08* (2013.01); *E21B 7/062* (2013.01); *E21B 17/1057* (2013.01); *G01B 5/12* (2013.01)

(58) Field of Classification Search
CPC .......... E21B 47/08; E21B 47/09; E21B 7/062; E21B 17/1057; G01B 7/12; G01B 7/28; G01B 5/12
See application file for complete search history.

(56) References Cited

U.S. PATENT DOCUMENTS

| | | |
|---|---|---|
| 2,544,609 A | 3/1951 | McMahan |
| 2,695,456 A | 11/1954 | Roberts |
| 4,243,099 A | 1/1981 | Rodgers |
| 4,289,025 A | 9/1981 | Norel et al. |
| 4,673,890 A | 6/1987 | Copland et al. |
| 7,389,828 B2 | 6/2008 | Ritter et al. |

(Continued)

FOREIGN PATENT DOCUMENTS

| | | |
|---|---|---|
| EP | 0697497 A1 | 2/1996 |
| WO | 1985002674 | 6/1985 |

OTHER PUBLICATIONS

Solberg, Silje Marie, "Improved drilling process through the determination of hardness and lithology boundaries" [May 2012; Norwegian University of Science and Technology] (Year: 2012).*

(Continued)

*Primary Examiner* — George S Gray
(74) *Attorney, Agent, or Firm* — Polsinelli PC (57) ABSTRACT

A dimensional characteristic of a borehole is determined from a rotary drilling system having a housing and an anti-rotation device with one or more drag members that engage a borehole wall. A sensor detects a biasing force on the drag members and transmits a signal representative of the force on the drag member to a control unit. The control unit determines a dimensional characteristic of the borehole based on the force on the drag member of the anti-rotation device.

16 Claims, 8 Drawing Sheets

(56) References Cited

U.S. PATENT DOCUMENTS

| | | | |
|---|---|---|---|
| 8,484,858 B2 | 7/2013 | Brannigan et al. | |
| 8,528,668 B2 | 9/2013 | Rasheed | |
| 2002/0185314 A1* | 12/2002 | Cargill | E21B 7/062 175/57 |
| 2006/0071663 A1* | 4/2006 | Stanley | F16L 55/28 324/323 |
| 2006/0249307 A1* | 11/2006 | Ritter | E21B 47/08 175/40 |
| 2009/0090554 A1* | 4/2009 | Sugiura | E21B 7/062 175/24 |
| 2010/0108386 A1 | 5/2010 | Martinez et al. | |
| 2014/0060933 A1 | 3/2014 | Rasheed | |
| 2015/0285607 A1* | 10/2015 | Helmore | E21B 47/02 33/558.2 |

OTHER PUBLICATIONS

3D Azimuthal LWD Caliper; SPE Annual Technical Conference and Exhibition, Sep. 29-Oct. 2, 2002; copyright 2002, Society of Petroleum Engineers Inc. ; www.onepetro.org/mslib/app/Preview.do?paperNumber=00077526&societyCode=SPE, pp. 1-17.

International Search Report and Written Opinion; PCT Application No. PCT/US2014/048039; dated May 22, 2015.

* cited by examiner

DIMENSIONAL CHARACTERISTIC DETERMINATIONS OF A WELLBORE

CROSS-REFERENCE TO RELATED APPLICATIONS

This application is a national stage entry of PCT/US2014/048039 filed Jul. 24, 2014, said application is expressly incorporated herein in its entirety.

FIELD

The present disclosure relates generally to drilling systems, and particularly to measuring borehole characteristics for drilling as a part of oil and gas exploration and production operations.

BACKGROUND

Oil and gas operations involve drilling deep within subterranean formations to access hydrocarbon reserves. Directional drilling has been employed as part of the drilling operations whereby boreholes are formed while drilling to desired locations. One of the aspects during drilling operations is developing accurate information regarding the borehole, the formation and environmental characteristics to better understand the success of operations and make informed decisions. Borehole logging is conducted to provide a detailed record of various properties and characteristics of the borehole and formation.

One type of directional drilling involves rotary steerable drilling systems. Rotary steerable drilling allows a drill string to rotate continuously while steering the drill string to a desired target location in a subterranean formation. Rotary steerable drilling systems are generally positioned at a lower end of the drill string and typically include a rotating drill shaft or mandrel, a housing that rotatably supports the drill shaft, and additional components within the housing that orient the toolface direction of the drill bit at the end of the drill shaft relative the housing. In some rotary steerable drilling systems, an anti-rotation device is provided to engage the borehole wall and prevent rotation of the housing.

After the borehole is drilled, specific characteristics are often not known. For instance, the dimensions of the drilled borehole are unknown unless specifically ascertained.

BRIEF DESCRIPTION OF THE DRAWINGS

Implementations of the present technology will now be described, by way of example only, with reference to the attached figures, wherein.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

In the following description, terms such as "upper," "upward," "lower," "downward," "above," "below," "downhole," "uphole," "longitudinal," "lateral," and the like, as used herein, shall mean in relation to the bottom or furthest extent of, the surrounding wellbore even though the wellbore or portions of it may be deviated or horizontal. Correspondingly, the transverse, axial, lateral, longitudinal, radial, and the like orientations shall mean positions relative to the orientation of the wellbore or tool. Additionally, the illustrated embodiments are depicted so that the orientation is such that the right-hand side is downhole compared to the left-hand side.

Several definitions that apply throughout this disclosure will now be presented. The term "coupled" is defined as connected, whether directly or indirectly through intervening components, and is not necessarily limited to physical connections. The connection can be such that the objects are permanently connected or releasably connected. The term "communicatively coupled" is defined as connected, either directly or indirectly through intervening components, and the connections are not necessarily limited to physical connections, but are connections that accommodate the transfer of data between the so-described components. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other thing that "substantially" modifies, such that the component need not be exact. For example, substantially cylindrical means that the object resembles a cylinder, but can have one or more deviations from a true cylinder. The terms "comprising," "including" and "having" are used interchangeably in this disclosure. The terms "comprising," "including" and "having" mean to include, but not necessarily be limited to the things so described.

The term "radial" and/or "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Disclosed herein is system and method for determining a dimensional characteristic of a borehole. The dimensional characteristics of the borehole can include the size, shape, and geometry of the borehole. The size can include the diameter, radius, circumference or other measurable characteristics of the borehole. In some examples, this can be carried out by use of the anti-rotation device of a rotary steerable drilling device. The drag members of the anti-rotation device can be resiliently deployed and extended to engage and contact the borehole wall, and by force of drag, resist rotation of the housing of the anti-rotation device. The dimensions of the borehole can be determined from the length by which the drag members extend to reach the borehole.

In particular, because drag members of the anti-rotation device extend radially from the housing to effectuate resistance to rotation, the drag members compress to some degree as they engage the borehole wall. For example, drag members can be mounted on a biasing mechanism, such as a spring, and when extended against the borehole wall, the spring is compressed to varying degrees. The radially extended position or length at which the drag member is extended determines, to a large degree, the amount of force being exerted on the drag member by the compression of the spring. In particular, the magnitude of the compression force being experienced in the spring is proportional to how much it is compressed. Accordingly, by measuring the magnitude of force being experienced in the spring, and which is in turn being exerted on the drag member, and knowing the spring constant, the degree of compression or extended length of the spring can be calculated, and therefore the distance at which the anti-rotation device is deployed can be determined. In other words, due to the relationship between force and spring length, the force experienced in the biasing member corresponds to the radially extended position of the drag member. From this radially extended position of the drag member, i.e., the extent (distance) by which the drag member is extended, the dimensions of the borehole can be determined. Moreover, an additional correction can be made accounting for the depth of penetration by the drag members into the borehole wall, based on formation rock characteristics. One or more controllers can be employed for processing and are communicatively coupled to force detecting sensors.

These measurements and resulting borehole dimensional determinations can be conducted continuously, or periodically, and furthermore can be conducted during drilling, or before, or after drilling.

Drill String and Rotary Steering Device

Figure 1:
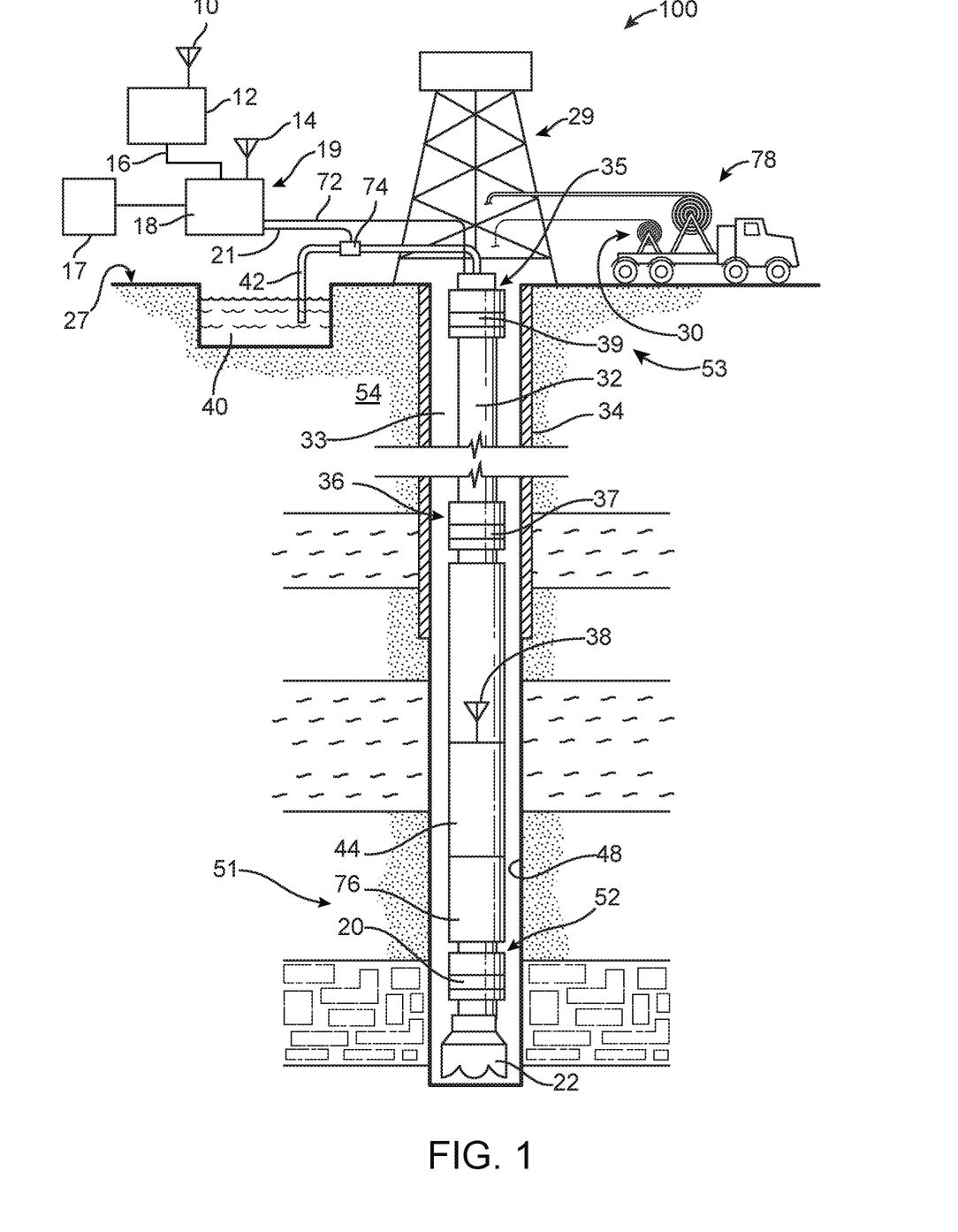
FIG. 1 is a diagram illustrating an embodiment of a drilling rig for drilling a wellbore with the drilling system configured in accordance with the principles of the present disclosure.

The present disclosure is described in relation to a rotary subterranean drill 100 that is depicted schematically in FIG. 1. A borehole 48 is shown that has been drilled into the formation 54 from the ground's surface 27 using a drill bit 22. The drill string 32 is elongate and extends lengthwise from an upper end 53 down the borehole 48 to a lower distal end 51. The drill bit 22 is located at the bottom, or lower distal end 51 of the drill string 32 and the bit 22 and drill string 32 are being advanced into the formation 54 by the drilling rig 29. The drilling rig 29 can be supported directly on land as shown or on an intermediate platform if at sea. For illustrative purposes, the top portion of the well bore includes casing 34 that is typically at least partially comprised of cement and which defines and stabilizes the wellbore after being drilled.

As shown in FIG. 1, the drill string 32 supports several components along its length. A sensor sub-unit 52 is shown for detecting conditions near the drill bit 22, conditions which can include such properties as formation fluid density, temperature and pressure, formation hardness, density, porosity, and azimuthal orientation of the drill bit 22 or string 32. In the case of directional drilling, measurement while drilling (MWD)/logging while drilling (LWD) procedures are supported both structurally and communicatively. The instance of directional drilling is illustrated in FIG. 1. The lower end portion of the drill string 32 can include a drill collar proximate the drilling bit 22 and a rotary steerable drilling device 20. The drill bit 22 may take the form of a roller cone bit or fixed cutter bit or any other type of bit known in the art. The sensor sub-unit 52 is located in or proximate to the rotary steerable drilling device 20 and advantageously detects the azimuthal orientation of the rotary steerable drilling device 20. Other sensor sub-units 35, 36 are shown within the cased portion of the well which can be enabled to sense nearby characteristics and conditions of the drill string, formation fluid, casing and surrounding formation characteristics, such as density, porosity, and hardness.

Regardless of which conditions or characteristics are sensed, data indicative of those conditions and characteristics is either recorded downhole, for instance at the processor 44 for later download, or communicated to the surface either by wire using repeaters 37,39 up to surface wire 72, or wirelessly or otherwise. If wirelessly, the downhole transceiver (antenna) 38 can be utilized to send data to a local processor 18, via topside transceiver (antenna) 14. There the data may be either processed or further transmitted along to a remote processor 12 via wire 16 or wirelessly via antennae 14 and 10.

Utilization in, and interaction with coiled tubing 78 and wireline 30 procedures is schematically indicated in FIG. 1 as being contemplated and within the context of this disclosure.

The possibility of an additional mode of communication is contemplated using drilling mud 40 that is pumped via conduit 42 to a downhole mud motor 76. The drilling mud is circulated down through the drill string 32 and up the annulus 33 around the drill string 32 to cool the drill bit 22 and remove cuttings from the borehole 48. For purposes of communication, resistance to the incoming flow of mud can be modulated downhole to send backpressure pulses up to the surface for detection at sensor 74, and from which representative data is sent along communication channel 21 (wired or wirelessly) to one or more processors 18, 12 for recordation and/or processing.

The sensor sub-unit 52 is located along the drill string 32 above the drill bit 22. The sensor sub-unit 36 is shown in FIG. 1 positioned above the mud motor 76 that rotates the drill bit 22. Additional sensor sub-units 35, 36 can be included as desired in the drill string 32. The sub-unit 52 positioned below the motor 76 communicates with the sub-unit 36 in order to relay information to the surface 27.

A surface installation 19 is shown that sends and receives data to and from the well. The surface installation 19 can exemplarily include a local processor 18 that can optionally communicate with one or more remote processors 12, 17 by wire 16 or wirelessly using transceivers 10, 14.

The rotary subterranean drill 100 can include a rotary drilling system comprising a rotary drilling device 20 incorporated as a portion of the drill string 32. An exemplary rotary steerable drilling device 20 is schematically shown in FIG. 1 and can also be referred to as a drilling direction control device or system. As shown, the rotary drilling device 20 is positioned on the drill string 32 with drill bit 22. However, one of skill in the art will recognize that the positioning of the rotary steerable drilling device 20 on the drill string 22 and relative to other components on the drill string 22 may be modified while remaining within the scope of the present disclosure.

Figure 2:
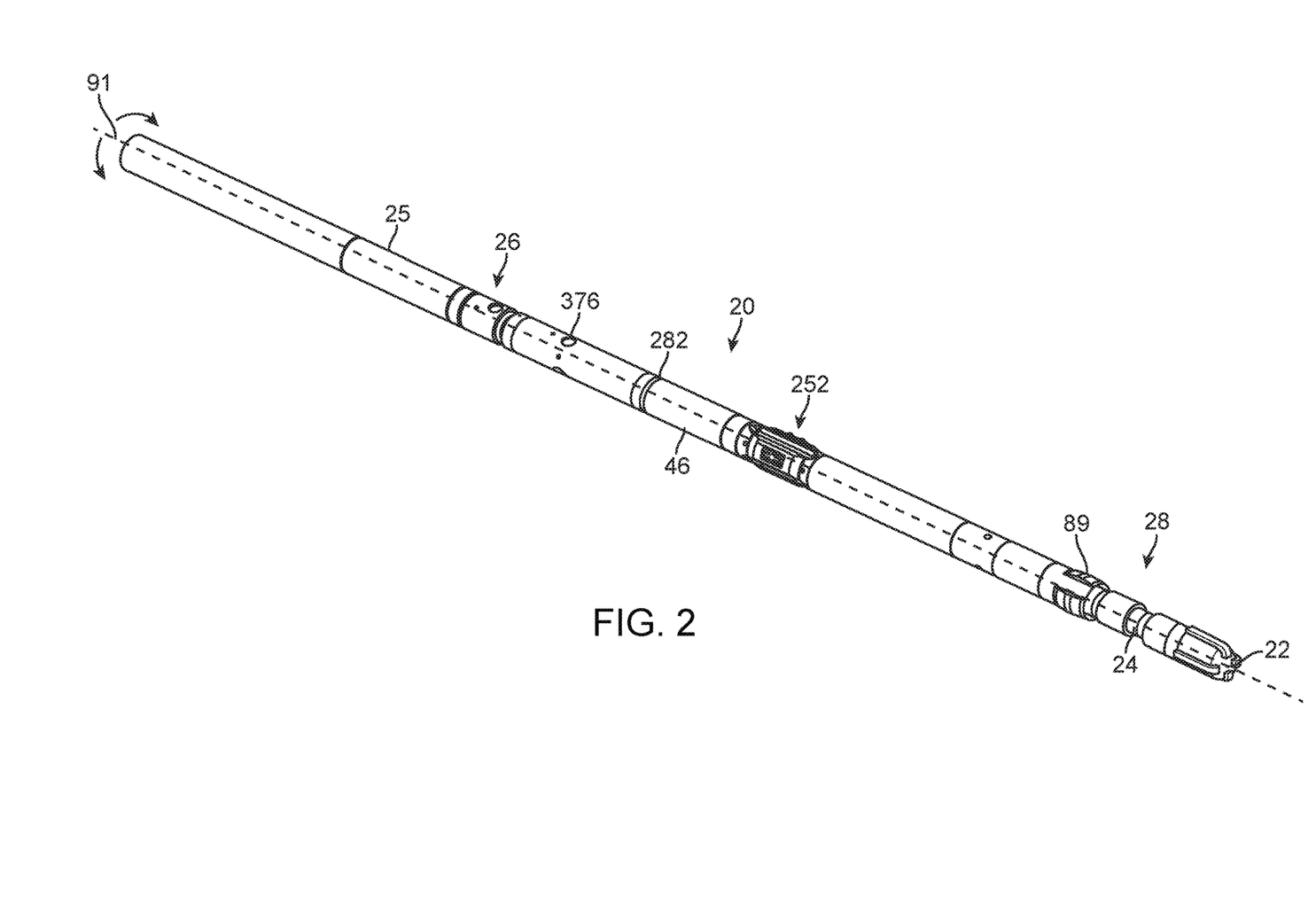
FIG. 2 is a diagram illustrating one embodiment of a rotary steerable drilling device according to the present disclosure.

Referring now to FIG. 2, the rotary steerable drilling device 20 is comprised of a rotatable drilling shaft 24 that is connectable or attachable to a rotary drill bit 22 and to a rotary drilling string 25 during the drilling operation. More particularly, the drilling shaft 24 has a proximal end 26 closest to the earth's surface and a distal end 28 deepest in the well, furthest from the earth's surface. The proximal end 26 is drivingly connectable or attachable with the rotary drilling string 25 such that rotation of the drilling string 25 from the surface results in a corresponding rotation of the drilling shaft 24. The proximal end 26 of the drilling shaft 24 may be permanently or removably attached, connected or otherwise affixed with the drilling string 25 in any manner and by any structure, mechanism, device or method permitting the rotation of the drilling shaft 24 upon the rotation of the drilling string 25. In this regard, a drive connection connects the drilling shaft 24 with the drilling string 25. As indicated, the drive connection may be comprised of any structure, mechanism or device for drivingly connecting the drilling shaft 24 and the drilling string 25 so that rotation of the drilling string 25 results in a corresponding rotation of the drilling shaft 24.

The distal end 28 of the drilling shaft 24 is drivingly connectable or attachable with the rotary drill bit 22 such that rotation of the drilling shaft 24 by the drilling string 25 results in a corresponding rotation of the drill bit 22. The distal end 28 of the drilling shaft 24 can be permanently or removably coupled with the drill bit 22 in any manner and by any structure, mechanism, device or method permitting the rotation of the drill bit 22 upon the rotation of the drilling shaft 24. In the exemplary embodiment, a threaded connection can be utilized.

The drilling shaft 24 may be comprised of one or more elements or portions connected, attached or otherwise affixed together in any suitable manner providing a unitary drilling shaft 24 between the proximal and distal ends 26, 28. In some examples, any connections provided between the elements or portions of the drilling shaft 24 are relatively rigid such that the drilling shaft 24 does not include any flexible joints or articulations therein. In one embodiment, the drilling shaft 24 is comprised of a single, unitary or integral element extending between the proximal and distal ends 26, 28. Further, the drilling shaft 24 is tubular or hollow to permit drilling fluid (mud) to flow therethrough in a relatively unrestricted and unimpeded manner.

The drilling shaft 24 can be comprised of any material suitable for and compatible with rotary drilling. In one embodiment, the drilling shaft 24 can be comprised of high strength stainless steel and is sometimes referred to as a mandrel.

The rotary steerable drilling device 20, as a component of a rotary drilling system, comprises a housing 46 having an anchorable exterior portion that rotatably supports a length of the drilling shaft 24 for rotation therein upon rotation of the attached drilling string 25. As the housing 46 can be a component of the rotary steerable drilling device 20, and the drilling device 20 can be incorporated as a portion of the drill string 32, the housing 46 is therefore also considered an incorporable portion of the drill string 32. The housing 46 may support, and extend along any length of the drilling shaft 24. However, in the illustrated example, the housing 46 supports substantially the entire length of the drilling shaft 24 and extends substantially between the proximal and distal ends 26, 28 of the drilling shaft 24. The drilling shaft 24 and the housing 46 can be each substantially cylindrical shaped and have a longitudinal centerline 91.

The housing 46 may be comprised of one or more tubular or hollow elements, sections or components permanently or removably connected, attached or otherwise affixed together to provide a unitary or integral housing 46 permitting the drilling shaft 24 to extend therethrough.

The rotary steerable drilling device 20 can optionally be further comprised of a near bit stabilizer 89, preferably located adjacent to the distal end of the housing 46. The near bit stabilizer 89 can be comprised of any type of stabilizer and may be either adjustable or non-adjustable.

The distal end comprises a distal radial bearing which comprises a fulcrum bearing, also referred to as a focal bearing, or some other bearing which facilitates the pivoting of the drilling shaft 24 at the distal radial bearing location upon the controlled deflection of the drilling shaft 24 by the rotary steerable drilling device 20 to produce a bending or curvature of the drilling shaft 24.

The rotary steerable drilling device 20 can further comprise at least one proximal radial bearing which can be contained within the housing 46 for rotatably supporting the drilling shaft 24 radially at a proximal radial bearing location defined thereby.

The deflection assembly within the rotary steerable drilling device 20 provides for the controlled deflection of the drilling shaft 24 resulting in a bend or curvature of the drilling shaft 24, as described further below, in order to provide the desired deflection angle of the attached drill bit 22. The orientation of the deflection of the drilling shaft 24 can be altered in order to change the orientation of the drill bit 22 or toolface, while the magnitude of the deflection of the drilling shaft 24 can also be altered to vary the magnitude of the deflection of the drill bit 22 or the bit tilt relative to the housing 46. The deflection assembly can include for example eccentric rings, having an outer eccentric ring and an inner eccentric ring which when rotated relative one another can deflect the shaft 24, and when rotated together affect the azimuthal toolface direction of the drill bit 22.

The rotary steerable drilling device 20 comprises a distal seal or sealing assembly and a proximal seal or sealing assembly 282. The distal seal can be radially positioned and provide a rotary seal between the housing 46 and the drilling shaft 24 at, adjacent or in proximity to the distal end of the housing 46. In this way, the housing 46 can be maintained as a compartment or container for the contents located therein. In at least one embodiment, the compartment is a closed compartment when it is sealed.

The rotary steerable drilling device 20 can include one or more thrust bearings at thrust bearing locations. Thrust bearings can be positioned at any location along the length of the drilling shaft 24 that rotatably and radially supports the drilling shaft 24 within the housing 46, but resists longitudinal movement of the drilling shaft 24 relative to the housing 46.

The rotary steerable drilling device 20 optionally can have a housing orientation sensor apparatus 52 as shown in FIG. 1 for sensing the orientation of the housing 46 within the wellbore. The housing orientation sensor apparatus 52 can contain an At-Bit-Inclination (ABI) insert associated with the housing 46. Additionally, the rotary steerable drilling device 20 can have a drilling string orientation sensor apparatus 376. Sensors which can be employed to determine orientation include for example magnetometers and accelerometers.

The rotary steerable drilling device 20 also can optionally have a releasable drilling-shaft-to-housing locking mechanism which can be used to selectively lock the drilling shaft 24 and housing 46 together. In some situations downhole, it is desirable that the shaft 24 not be able rotate relative to the housing 46. One such instance can be if the drilling device 20 gets stuck downhole; in that case it may be desirable to attempt to rotate the housing 46 with the drill string to dislodge the drilling device 20 from the wellbore. In order to do that, the locking mechanism is engaged (locked) which prevents the drilling shaft 24 from rotating in the housing 46, and turning the drill string turns the housing 46.

Further, in order that information or data may be communicated along the drilling string 25 from or to downhole locations, the rotary steerable drilling device 20 can include a drilling string communication system as earlier described. Further details regarding the locking mechanism are presented below.

Anti-Rotation Device

Referring to FIG. 2 and as explained above, during drilling, the rotary steerable drilling device 20 can be anchored in the wellbore against rotation which would otherwise be imparted by the rotating drilling shaft 24. As previously noted, the housing 46 of the drilling device 20 has an anchorable exterior portion. In fact any tool having an outer surface or outer portion of a housing for anchoring against rotation can be considered to have an anchorable exterior portion. To effect such anchoring, there is provided one or more anti-rotation devices 252 associated with the rotary steerable drilling device 20 for resisting rotation within the wellbore. Any type of anti-rotation device 252 or any mechanism, structure, device or method capable of restraining or inhibiting the tendency of the housing 46 to rotate upon rotary drilling can be used.

Figure 3:
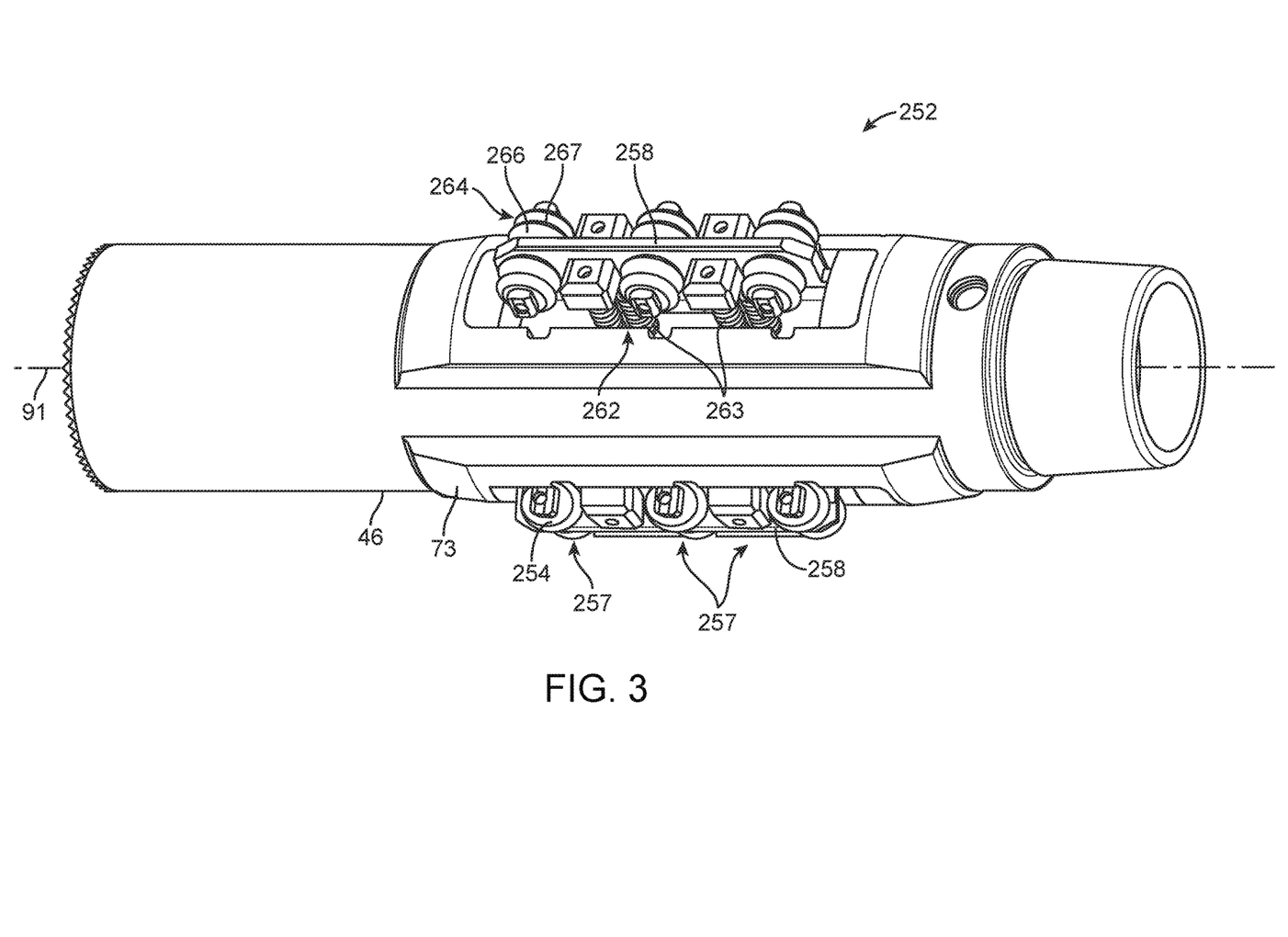
FIG. 3 is a diagram illustrating one embodiment of an anti-rotation device according to the present disclosure.

Referring now to FIG. 3, the anti-rotation device 252 can be associated with any portion of the housing 46 including proximal, central and distal housing sections. In other words, the anti-rotation device 252 can be located at any location or position along the length of the housing 46 between its proximal and distal ends. In the illustrated embodiment, the device 252 is associated with the proximal housing section, upward, toward the ground's surface. Finally, the device 252 may be associated with the housing 46 in any manner permitting the functioning of the device 252 to inhibit or restrain rotation of the housing 46. The anti-rotation device 252 can be positioned at an exterior surface of the housing 46.

In some examples, the anti-rotation device 252 can have one or more sets 257 of radially deployable drag members 254 (the six drag members 254 associated with each frame 258 can be considered one set), extensible with respect to the longitudinal centerline 91 of the housing 46. In other examples, three sets 257 of drag members 254 can be spaced peripherally (circumferentially) at equidistant points about the housing 46, for example each at 120 degrees from each other. In other embodiments, there can be a plurality of sets 257 of drag members 254 spaced about the housing 46, set at equidistant points, for example, 2, 3, 4, 6, 7, 8, or more sets 257 of drag members 254. In some examples, either alone, or among a plurality of sets 257 of drag members 254, two sets of drag members can be spaced 180 degrees from on another peripherally around the housing. Further, although in the illustrated example of FIG. 3 there is shown three pairs of drag members for each set 257, any number of drag members can be employed. For example, 1, 2, 3, 4, 5, 6, 7, 8, 9, 10 or more drag members can be employed for each set. The number of drag members can vary depending on the formation type, well conditions, as well as other considerations.

As shown in FIG. 3, the drag members 254 can be wheels or rollers and resemble round "pizza cutters" that extend at least partially outside the rotary steerable drilling device 20 and project into the formation surrounding the borehole when deployed. The drag members 254 are aligned for rotation down the wellbore, allowing the rotary steerable drilling device 20 to progress downhole during drilling. Each drag member 254 is oriented such that it is capable of rotating about its axis of rotation in response to a force exerted tangentially on the drag member 254 substantially in a direction parallel to the longitudinal axis 44 of the housing 46. For instance, as a longitudinal force is exerted through the drill string 25 to the drilling shaft 24 in order to progress drilling, the drag member 254 rolls about its axis to facilitate the drilling device's 20 movement through the wellbore in either a downhole or uphole direction.

The drag members 254 resiliently engage the wall of the borehole to slow or inhibit turning of the housing 46 with the drilling shaft 24 while drilling. The shaft 24 contained within the housing 46 rotates in the clockwise direction, thus imposing a tendency in the housing 46 to also rotate. Accordingly, drag members 254 can have any shape or configuration permitting them to roll or move longitudinally through the wellbore, while also restraining the housing 46 against rotation within the wellbore. Accordingly, the housing 46 can be referred to as a non-rotating housing, wherein it is understood that the housing is substantially non-rotating, having for example one or two full rotations per hour.

Therefore, each drag member 254 has a peripheral surface 264 about its circumference permitting it to roll or move longitudinally within the wellbore and resist rotation. The periphery of each of the plurality of drag members 254 can be shaped to penetrate borehole-surrounding formation material. In particular, the peripheral surface 264 is differently shaped on each side presenting a resistive side-face 266 and a slip side-face 267. In particular, resistive side-face 266 is radiused with sufficient concavity that during clockwise torque or rotation of the housing 46, the drag member 254 penetrates into the formation and resists housing 46 rotation. Slip side-face 267 presents a beveled surface or ramp that permits rotation of the housing 46 in the counter-clockwise direction, albeit, with a certain amount of drag associated with the slippage. Therefore, rather than cutting into the formation during a counter-clockwise rotation of housing 46, slip side-face 267 can scrape or slip along the wellbore surface, permitting rotation.

As depicted in FIG. 3, the drag members 254 can be attached or mounted to frames 258 that act as carriage assemblies that can be mounted, connected or affixed at the outer surface of the housing 46 in any suitable manner. In some examples, the plurality of frames 258 are circumferentially and equidistantly spaced about the housing 46, and can be located to extend from within platforms 73. A biasing mechanism or device can be provided made up of, for example, a spring 263 that acts directly or indirectly between the housing 46 and the carriage assembly 258 or the drag members 254. In other embodiments, the biasing mechanism can be inflatable pads, which inflate to deploy the drag members 254 against a borehole wall.

The drag members 254 can be deployed radially outwardly from the housing in several ways. For example, as shown in FIG. 3, a biasing member 262 in the form of the illustrated spring 263 resiliently urges and extends the drag members 254 radially outwardly from the housing 46 toward an outwardly deployed position. In such example, due to the natural bias of the spring, the drag members 254 remain extended radially outwardly from the housing at all times. Accordingly, when placed in a borehole the drag members 254 engage the borehole and the spring 263 compresses and contracts, thereby moving radially in and out relative the housing 46 depending on the size of the borehole. Additionally, due to the bias of the spring, the drag members press against and penetrate into the borehole wall. In other examples, the drag members 254 can have a retracted and extended position, thus being deployed when in the extended position. For example, reciprocating ramps can be provided beneath the springs 263, which can be moved back and forth raising and lowering the springs thereby extending and retracting the drag members 254. In other embodiments, the platforms 73 can be made to raise and deploy the drag members 254 against a borehole wall. In other embodiments, hydraulic actuators can be provided beneath the drag members 254, or as part of drag members 254, to provide pressure and deploy to extend the drag members 254. In other embodiments, rather than springs 263, inflatable pads can be employed which upon inflating extend drag members 254 to a deployed position. The inflatable pads can be filled with pressurized fluid to engage drag members 254 against the borehole wall.

Accordingly, deployment of the drag members 254 can be carried out in a multitude of ways. A deployed position can be considered any position where the drag members are extended outside of the housing 46 to a degree where contact with a borehole wall occurs when placed in a borehole, thereby providing anti-rotational drag.

Determining Borehole Dimensional Characteristics

The dimensional characteristics of the borehole can be determined by employing aspects of the anti-rotation device 252. In particular, because the drag members 254 of the anti-rotation device 252 resiliently extend and engage the borehole walls when deployed, detection or determination of the radially extended position of the drag members provides information regarding the size and shape and other dimensional characteristics of the borehole. This can be seen with respect to FIG. 4, where as shown, a rotary steerable drilling device 20 with housing 46 and anti-rotation device 252 is placed within borehole 48. The borehole has a dimensional characteristic, namely the diameter, n, of the borehole.

Figure 4:
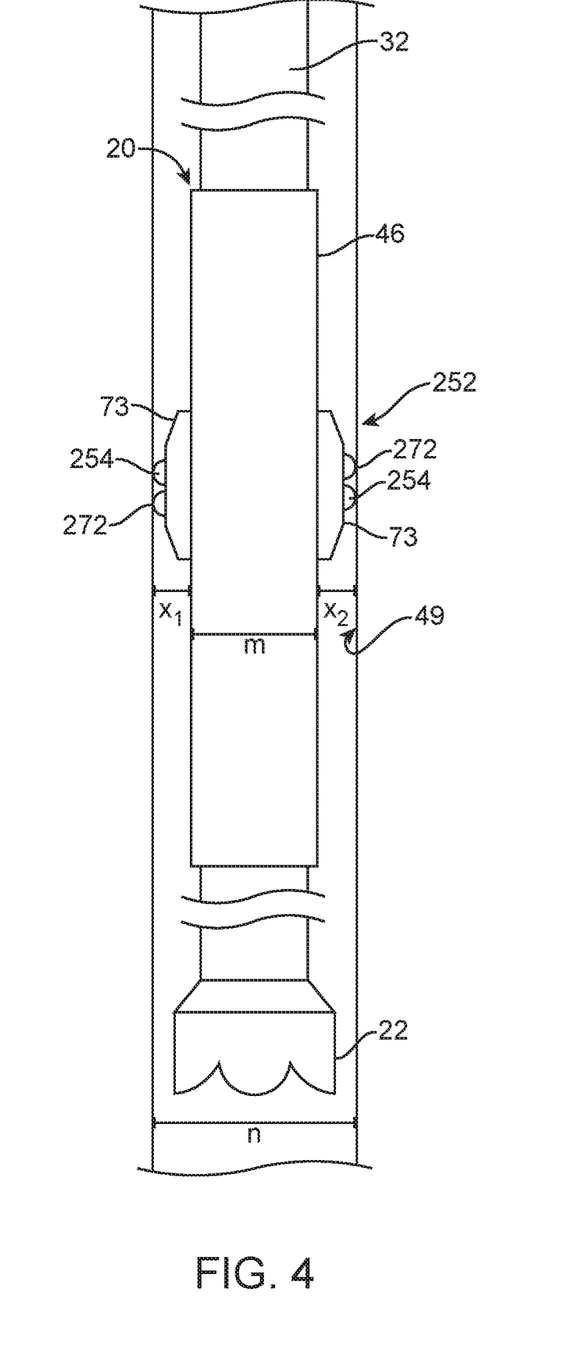
FIG. 4 is a diagram illustrating one embodiment of a rotary steerable drilling device with deployed drag members according to the present disclosure.

As shown in FIG. 4, with insertion of the rotary steerable drilling device 20, the drag members 254 of the anti-rotation device 252 are deployed and in contact with the borehole wall 49. In the example, drag members 254 of the anti-rotation devices 252 on either side of the housing 46 are positioned circumferentially at 180 degrees from one another. As noted previously, when three sets 257 of drag members 254 are employed they will typically be spaced 120 degrees from one another. Other spacing can be employed, and furthermore, additional sets 257 of drag members 254 can be employed and spaced, for example, equidistant or otherwise about the housing 46. As shown, the housing 46 has a diameter, m, which is smaller than the diameter, n, of the borehole 48. Accordingly, between the housing 46 and the borehole wall 49 is a space, or annulus, having lengths $x_1$ and $x_2$ on either side of the housing 46, which can be the same or different. Accordingly, in one sense, the diameter of the borehole, n, is equal to the diameter of the housing, m, plus the lengths $x_1$ and $x_2$ of the annulus. Since the housing diameter, m, is known, as it can be measured beforehand, or predetermined, then once the lengths $x_1$ and $x_2$ are found, the diameter, n, of the borehole 48 can be determined.

As can be seen in FIG. 4, the deployed drag members 254 extend from the housing 46 by the lengths $x_1$ and $x_2$ to contact the borehole wall 49. Therefore, because drag members 254 extend to radial positions equivalent to lengths $x_1$ and $x_2$ to reach the borehole wall 49, by determining the length by which the drag members 254 are extended beyond the housing 46, the lengths $x_1$ and $x_2$ are necessarily found. With lengths $x_1$ and $x_2$ known, along with the diameter of the housing 46, the diameter of the borehole can then be found.

The extent at which a particular drag member 254 is deployed can be determined based on the magnitude of the force by which the drag member 254 is being pressed against the borehole wall 49. In particular, the force experienced in the spring 263 directly corresponds to the radially extended position, or extended length, of the drag member 254. This is based on the principle of physics that force applied to a spring is proportional to its compression, for example, F=kx, where F is force, and x is distance, and k is a constant intrinsic to the spring. Recalling that in the exemplary embodiments shown in FIG. 3, a spring 263 is employed in radially extending the drag members 254, the force experienced by the spring 263 can be used to determine the degree by which spring 263 is compressed.

For example, a reduction in spring 263 length (degree of compression) can be calculated based on the force measured in the spring 263. This calculated length can then be deducted from the known relaxed length of the spring 263 to determine the current extension length of the spring 263. Taking into account the otherwise fixed geometries of the anti-rotation device 252, the extension length of the spring 263 can then be used to determine the position of the associated drag member 254, and in turn, the borehole wall 49 against which the drag member 254 is pressing under the biasing force of the spring 263.

Therefore, by measuring the magnitude of force in the spring and therefore on the drag members, the amount that spring 263 is compressed can be calculated, and the corresponding length of the spring 263 and radially extended position of the drag members 254 determined. For example, a sensor 271 coupled to the spring 263 or drag members 254, or otherwise coupled to the anti-rotation device 252 can detect the magnitude of force. A signal representative of the detected force magnitude can then be transmitted from the sensor 271 to a controller for processing, the controller being communicatively coupled to the sensor 271. The controller can be programmable and the communication can be electronic. Based on the signal, the controller can calculate or determine the dimensional characteristic of the borehole based on the degree of compression of the spring 263.

Given that other components, such as frames 258 can also be present, the contribution of their given lengths should be accounted for in determining the total radius or diameter of the borehole. For example, the length of the extended drag members 254 includes the size of the drag members, or "pizza cutters" themselves, as well as the spring 263. To the extent that frames 258, housing 46 or other components contribute to extension length, these can be considered in determining a final dimension. However, as the spring 263 is the only portion that will vary in length from one position to another, or borehole to borehole, only the length of this component need be calculated, as the length of other components are predetermined or can be measured.

For example, although in the instant example the diameter of the housing 46 is used as a reference point for determining the diameter of the borehole, in other examples other reference points may be considered. For example, the springs 263 of the drag members 254 can extend from a base beneath the surface of the housing 46. In such case, the depth below the surface of the housing 46 must be accounted for in determining the full length of the deployed drag members 254. In other cases, the centerline 91 of the housing 46 could be used as a reference point for determining the length which the drag members 254 extend. For example, the base from which the drag members extend can be located a distance from the centerline 91. Accordingly, the length by which the drag members 254 extend from the base could be added to the distance of the base from centerline 91 in order to obtain the radius from the centerline 91 to the borehole wall 49. Any number of reference points could be used, such as the housing 46, or centerline 91, for example, to determine the radius, diameter or other dimensional characteristic of the borehole.

Therefore, in determining the size of the borehole, the length of extension of the drag members 254 is determined along with the length of the any other components which contribute to the length. As only the extended length of the drag members 254 vary, due to the presence of spring 263, this length is the basis for determining the size and shape of the borehole.

Figure 5A:
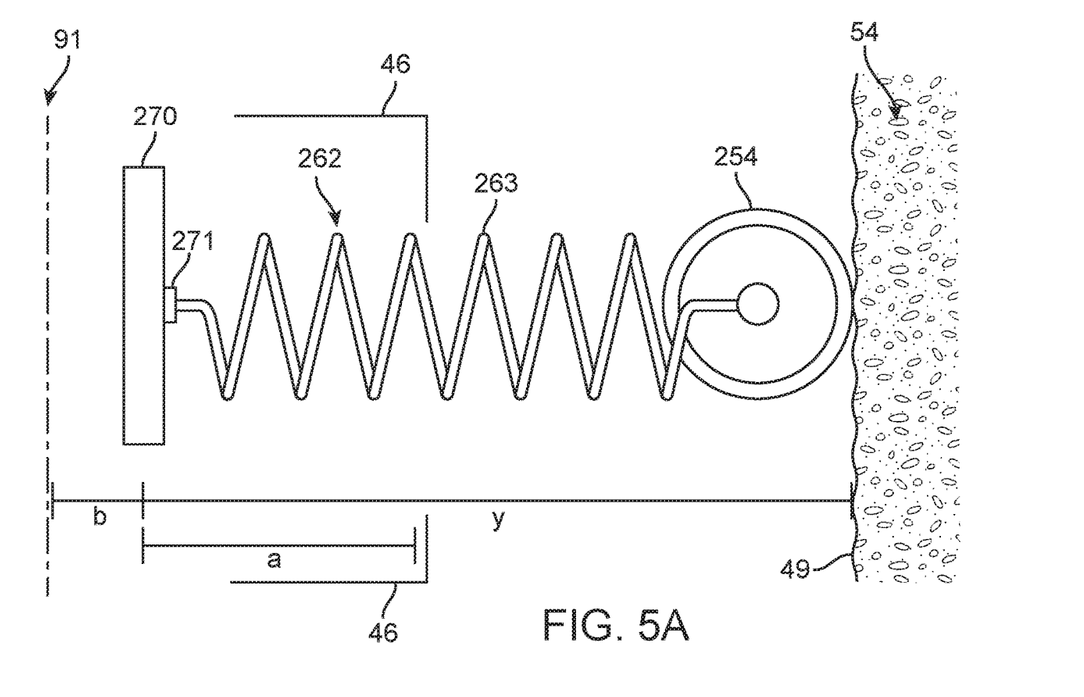
FIG. 5A is a diagram illustrating a drag member at one extension length according to the present disclosure.
Figure 5B:
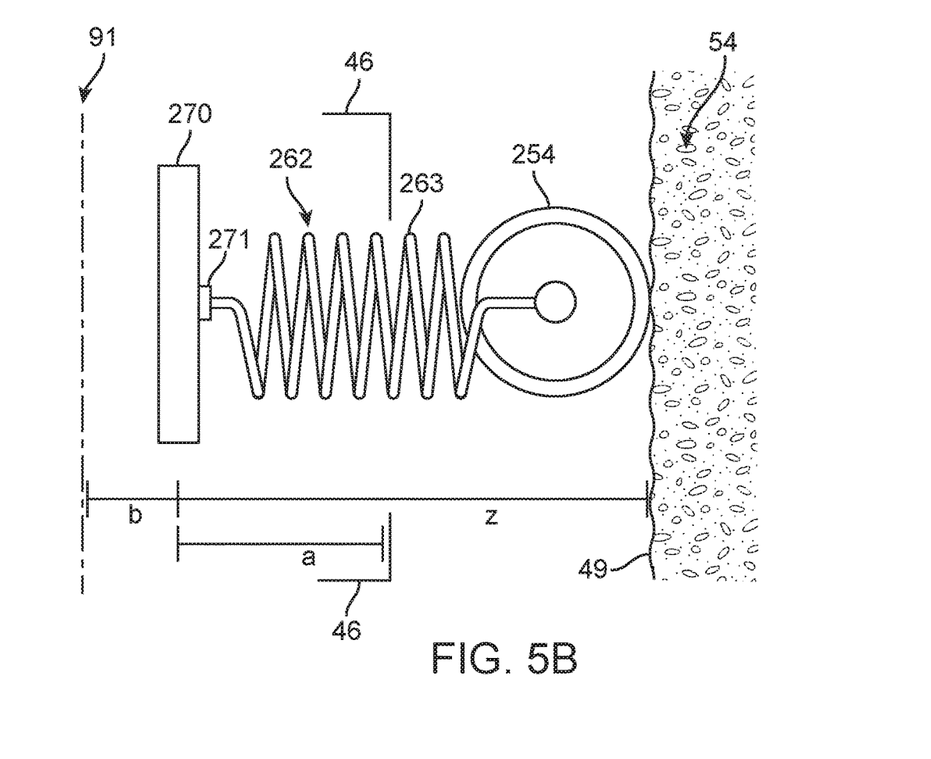
FIG. 5B is a diagram illustrating a drag member at one extension length less than that shown in FIG. 5A according to the present disclosure.

FIGS. 5A and 5B illustrate a biasing member 262, exemplified as compression of springs 263, deployed in a borehole. As shown in FIGS. 5A and 5B, drag members 254 with springs 263 are illustrated extended at two different lengths, y and z respectively, from housing 46 into contact with the borehole wall 49. The base 270 from which the drag members 254 extend can have a force sensor 271 which detects the magnitude of force experienced on the drag members 254 and in the springs 263. The sensor 271 can be a transducer or other type of sensor 271 capable of detecting magnitude of force and can be communicatively coupled to a controller. Among other forms, the sensor 271 can also be a pressure sensor in the case where the biasing member 262 is an hydraulic spring 263.

The borehole diameter is smaller in FIG. 5B than in FIG. 5A, and thus the spring 263 is compressed to a greater extent in FIG. 5B than in FIG. 5A. Correspondingly, the radially extended position of drag members in FIG. 5B is less than the radially extended position in FIG. 5A. As a result, the length z by which drag member 254 is extended is less in FIG. 5B than the length y FIG. 5A. Further, because of the greater compression of the spring 263 in FIG. 5B, the measurable force on the springs 263 will be larger in FIG. 5B than in FIG. 5A. Both lengths x and y can be calculated by measuring the force experienced on the drag members 254 by the borehole wall 49. Because the degree of compression is proportional to the force experienced in the springs, the force detected at the sensor 271 in base 270 can be used to calculate the lengths y and z. Accordingly, the force is detected at the sensor 271 in base 270 and the degree of compression calculated. The degree of compression can be deducted from the maximum length of the spring in the relaxed state to obtain the length y and z. With this information, the radius or diameter of the borehole wall can be calculated.

As an example, the position of the base 270 relative the housing 46 or the centerline 91, or some other reference point can be measured or predetermined. In FIGS. 5A and 5B, the distance from the base 270 to the centerline 91 is "b". Accordingly, once the length x or y is calculated it can be added to distance b, resulting in the radius of the borehole from the centerline. Thus, the radius of the borehole is the distance of the base 270 b, added with x or y, which is the length of the compressed spring 263 and length of drag members 254. Alternatively, the base 270 can be set a distance, a, from housing 46. Accordingly, with x or y calculated, along with dimension a being a known value, the length by which the drag members 254 extend beyond the housing 46 can be calculated. With the radius of the housing 46 known, the radius of the borehole can then be calculated.

Further, with the drag member 254 extending in one direction to the borehole wall 49, the radius can be calculated. By extending a second drag member 254 circumferentially 180 degrees around on the other side of the housing 46, the diameter of the borehole can be determined. In other examples, a plurality, or more than two drag members 254 can be extended, such as 3, 4, 5, 6, 7 or 8 or more can be extended to measure the length to the borehole wall. With such multiple measurements, a more accurate determination of the size, geometry and shape of the borehole can be determined.

Although the spring 263 is employed in the examples above, other biasing mechanisms may also be used, for example expandable pads or hydraulic actuators. Any biasing mechanism where applied force can be related to length can be employed herewith. For example, with expandable pads, the force of the borehole wall imposed on the pads can be measured by the pressure of the fluid in the pads. Therefore, the pressure of the inflatable pads will be related to the length to which they inflate to engage and contact the borehole wall 49. Accordingly, similar to springs, inflatable pads can be used in determine the length. Moreover, hydraulic actuators can be used to extend drag members toward the borehole wall and fluid measurements can be used to calculate the degree of extension of such actuators.

Use of Formation Rock Characteristics

As described above, deployment of the drag members 254 results in contact with borehole wall 49. Furthermore, due to the bias of the spring 263, the drag members 254 penetrate into the borehole wall 49. The depth at which the drag members 254 penetrate depends on the characteristic of the rock making up the formation. For example, if the formation is made up of harder rock, the depth of penetration by drag members 254 will be relatively small. Whereas, with the formation made up of a softer rock material, the drag members 254 will penetrate to a greater depth.

By correcting for the depth of penetration by the drag members 254 into the borehole wall 49, the determination of the borehole size and shape can be made more accurate. If the depth of penetration is not accounted for, the borehole radius or diameter will appear larger than it is in actuality. For example, if the drag members 254 penetrate one-half inch into the borehole wall, then the borehole will appear to be one-half inch larger, and thus, in such example, would result in one inch overestimation of the diameter of the borehole. Penetration of the drag members is illustrated, for example, in FIG. 6.

Figure 6:
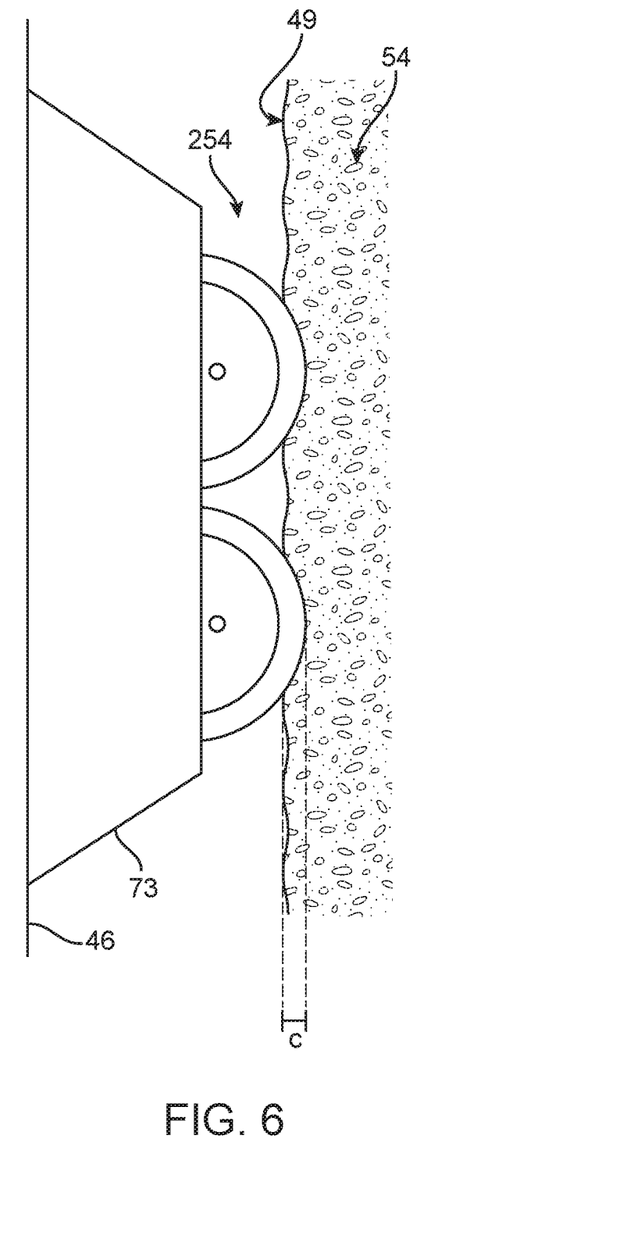
FIG. 6 is a diagram illustrating penetration by a drag member into a borehole wall according to the present disclosure.

Referring to FIG. 6, the drag members 254 are deployed from the housing 46 upon the platform 73, and penetrate into the formation's 54 borehole wall 49 by the depth, c. The depth c can vary depending on the formation hardness characteristic, whether soft rock or hard. The formation hardness can be determined directly or indirectly. However, the formation rock type, hardness characteristic, and other properties are generally determined or accessible from storage media during wireline lithology logging operations. In some examples, data regarding the formation can be gathered in logging while drilling (LWD) applications (see FIG. 1). LWD permits evaluation of the formation characteristics during drilling operations. During such LWD operations, analyses including gamma detection, porosity, density, hardness and other characteristics regarding the formation disclosed herein can be obtained and logged. Additionally, or alternatively, wireline analysis regarding the formation characteristics can be conducted by removal of the drill string employed in LWD and lowering analytical tools by a conveyance such as a wire into the borehole. In this way information regarding the formation characteristics can be obtained also by wireline. The analysis of the lithology and rock type of the formation is generally carried out and/or stored in the memory of a programmable controller downhole or at the surface. The term lithology employed herein can generally refer to any physical rock property such as type, hardness, porosity, density, permeability, or other characteristic which can affect the depth of penetration by drag members into the formation.

Determination of the lithology or rock hardness can be conducted directly, for example obtaining a fragment downhole via mud returned from the subsurface, or retrieved by other means. The rock fragments can then be analyzed for hardness, and the results stored in a controller or called to by the controller. Lithology and hardness of the rock can also be determined by indirect means. For example acoustic logging can be conducted, which can be carried out by transmitting acoustic waves into the formation. Additional logging techniques include for example thermal and epithermal neutron measurements, as well as gamma ray logging techniques to obtain density. However, despite the availability of direct and indirect methods, information regarding the characteristics and property of the rock can be purchased from commercially available catalogs of data, surveys, or previous logging operations. Various rock types can include for example, sandstone, limestone, dolomite, clay, shale, as well as many other types of rock, having variable porosity, permeability, density and ultimately hardness. Accordingly, either directly or indirectly, lithology logging data can be obtained.

With such lithology information characterizing the hardness of the rock, the depth of penetration by deployed drag members 254 can be determined. For example, once the type and/or hardness of the rock in the borehole is determined, testing can be conducted to determine the degree to which the drag members 254 penetrate the various types of rock at a given biasing force. This information can be input into a programmable controller to be accessed when appropriate to determine penetration depth when in the borehole. Alternatively, a calculation can be conducted to provide an estimated penetration depth taking into account the spring strength of the drag members 254 in view of the type and/or hardness of the rock formation. Such estimated penetration depths can then be saved for use by a controller in making dimensional characteristic determinations described herein.

Accordingly, when determining the dimensional characteristic of a borehole 48, the depth of penetration by the drag members 254 can be subtracted from the final determination. For example, the lithology logging data can be accessed to determine the rock hardness of the formation. The penetration depth of the drag members 254 can be determined based on the rock hardness, and then subtracted from the extended length of the drag members 254 or from the final borehole size determination, thus correcting for drag member penetration 254.

Method for Determining Dimensional Characteristics Using a Controller

Figure 7:
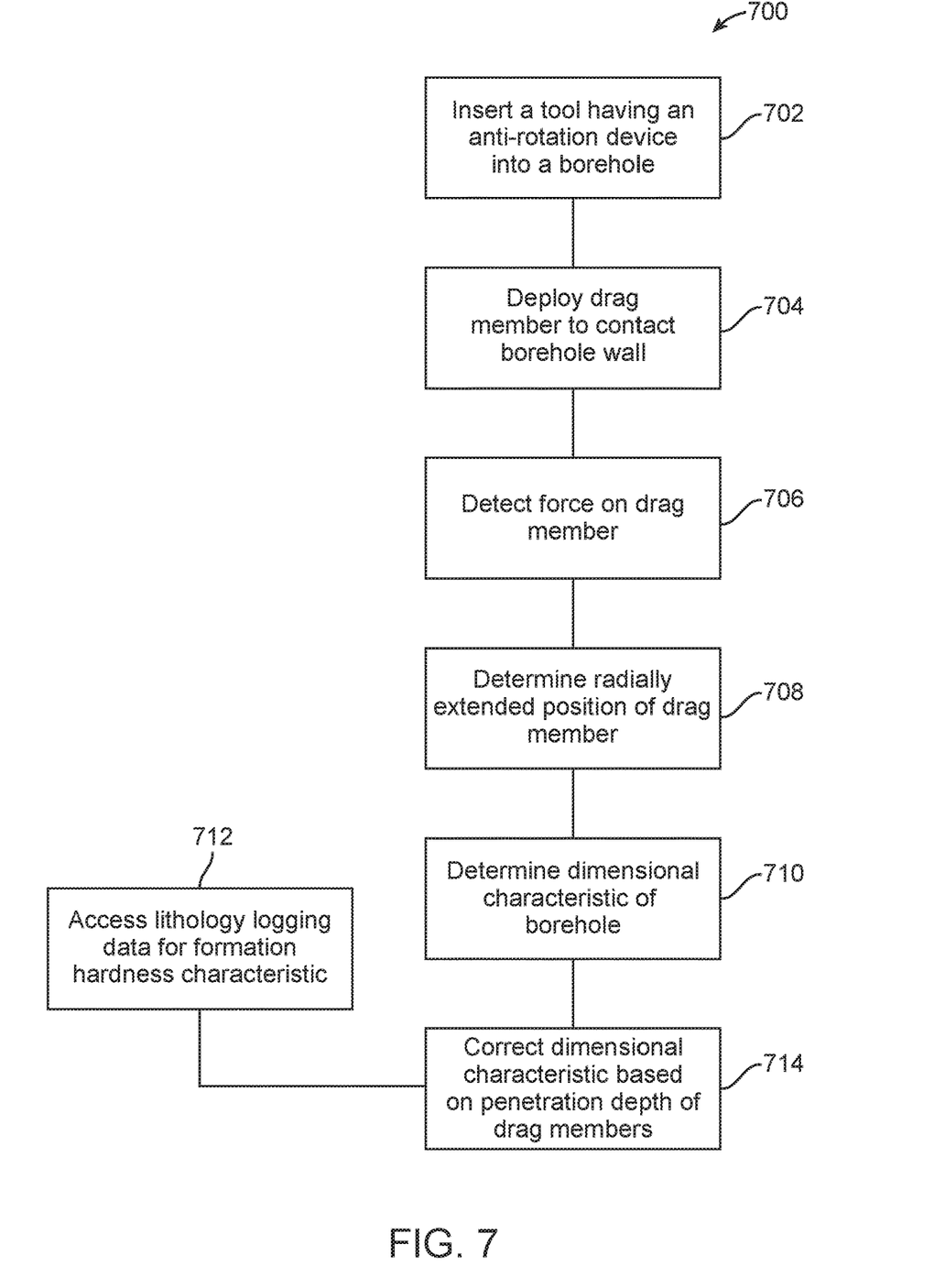
FIG. 7 is a flow diagram illustrating one method for determining a dimensional characteristic of a borehole according to the present disclosure.

FIG. 7 illustrates an exemplary method 700 according to the present disclosure. The method can be practiced by the systems disclosed herein or other appropriate systems. Any of the method steps can be carried out or by use of a controller having a processor, and which is optionally programmable. As shown in 702, the method includes inserting a tool having an anti-rotation device, such as a rotary steerable drill or other rotary drilling system into a borehole. Next, as shown in 704, a drag member of the anti-rotation device can be deployed to contact the borehole wall. Due to a biasing member, such as a spring, the drag member is pressed into contact with the borehole wall. As shown in 706, a sensor detects the magnitude of force in the biasing member which is being exerted on the drag member. As the force in the spring is related to its degree of compression, the radially extended position of the drag member by the spring can be determined, as shown in step 708. Accordingly, thereafter, as shown in step 710, a dimensional characteristic of the borehole can be determined, including radius, diameter, size, shape, geometry or other characteristic.

Furthermore, as a correction and to obtain more accurate measurement of the borehole, the depth of penetration by the drag member(s) into the borehole wall can be taken into account. For example, as shown in 712, lithology logging data can be obtained and accessed for the hardness characteristics of the rock making up the formation. With such data, the depth of penetration into the wall of the borehole by the drag member(s) can be determined. Accordingly, as shown in 714, the corrected dimensional characteristic can be determined by taking into account the penetration depth, for example by subtracting such depth from the final determined size of the borehole. Therefore, by the exemplary method 700, a dimensional characteristic of the borehole can be determined.

As discussed, a controller or controllers having a processor and optional memory can be employed for making the calculations and prescribed determinations. A controller can be associated with the anti-rotation device, or the rotary steerable unit, and can include any of the processors 12, 18, 44 depicted in FIG. 1 or other processors associated with the rotary drilling system. The controller or controllers implementing the processes according to the present disclosure can comprise hardware, firmware and/or software, and can take any of a variety of form factors. In particular, the controllers described herein can include at least one processor optionally coupled directly or indirectly to memory elements through a system bus, as well as program code for executing and carrying out processes described herein. A "processor" as used herein is an electronic circuit that can make determinations based upon inputs. A processor can include a microprocessor, a microcontroller, and a central processing unit, among others. While a single processor can be used, the present disclosure can be implemented over a plurality of processors. For example, the plurality of processors can be associated with local controllers of the rotary steerable drilling device, a global controller and/or the surface operator controller, or a single controller can be employed. Accordingly, for purposes of this disclosure, when referring to a controller, it can include a local controller or any other controller or plurality of controllers on the surface, in the drill string, rotary steerable drilling device or elsewhere.

Figure 8:
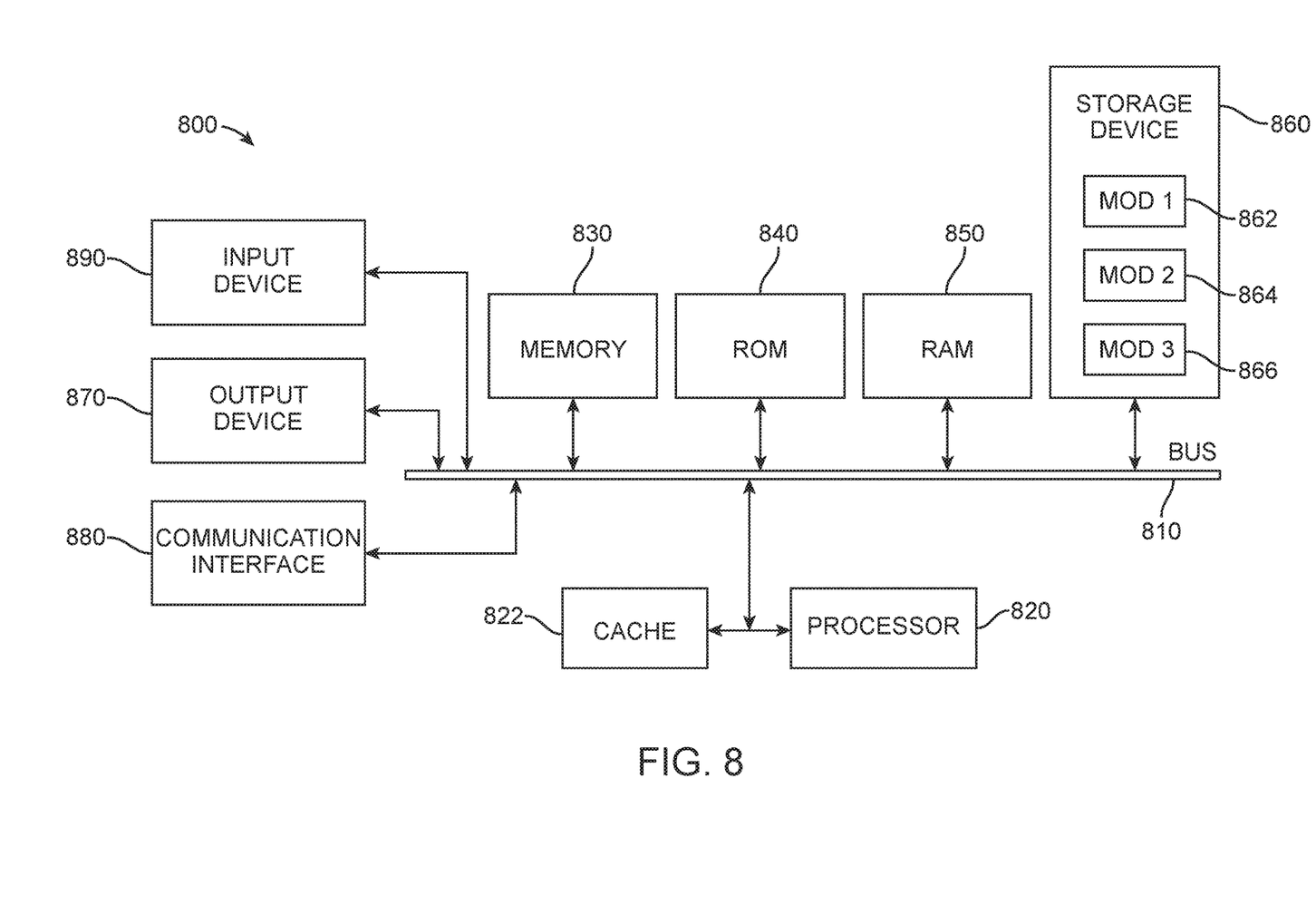
FIG. 8 is a schematic of an exemplary controller for having a processor suitable for use in the methods and systems disclosed herein.

With reference to FIG. 8, an exemplary system and/or controller 200 includes a processing unit (for example, a central processing unit (CPU) or processor) 820 and a system bus 810 that couples various system components, including the system memory 830 such as read only memory (ROM) 840 and random access memory (RAM) 850, to the processor 820. The system 800 can include a cache 822 of high-speed memory connected directly with, in close proximity to, or integrated as part of the processor 820. The system 800 can copy data from the memory 830 and/or the storage device 860 to the cache 822 for access by the processor 820. These and other modules can control or be configured to control the processor 820 to perform various operations or actions. The memory 830 can include multiple different types of memory with different performance characteristics.

Multiple processors or processor cores can share resources such as memory 830 or the cache 822, or can operate using independent resources. The processor 820 can include one or more of a state machine, an application specific integrated circuit (ASIC), or a programmable gate array (PGA) including a field PGA. The system bus 810 can be any of several types of bus structures including a memory bus or memory controller, a peripheral bus, and a local bus using any of a variety of bus architectures. A basic input/output (BIOS) stored in ROM 840 or the like, may provide the basic routine that helps to transfer information between elements within the computing device 800, such as during start-up.

The computing device 800 can further include storage devices 260 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 860 can include software modules 862, 864, 866 for controlling the processor 820. The system 800 can include other hardware or software modules. Although the exemplary embodiment(s) described herein employs the hard disk 860, other types of computer-readable storage devices which can store data that are accessible by a computer, such as magnetic cassettes, flash memory cards, digital versatile disks (DVDs), cartridges, random access memories (RAMs) 850, read only memory (ROM) 840, a cable containing a bit stream and the like may also be used in the exemplary operating environment. Tangible computer-readable storage media, computer-readable storage devices, or computer-readable memory devices, expressly exclude media such as transitory waves, energy, carrier signals, electromagnetic waves, and signals per se.

The basic components and appropriate variations can be modified depending on the type of device, such as whether the device 800 is a small, handheld computing device, a desktop computer, or a computer server. When the processor 820 executes instructions to perform "operations", the processor 820 can perform the operations directly and/or facilitate, direct, or cooperate with another device or component to perform the operations.

To enable user interaction with the computing device 800, an input device 890 represents any number of input mechanisms, such as a microphone for speech, a touch-sensitive screen for gesture or graphical input, keyboard, mouse, motion input, speech and so forth. An output device 870 can also be one or more of a number of output mechanisms known to those of skill in the art. In some instances, multimodal systems enable a user to provide multiple types of input to communicate with the computing device 800. The communications interface 880 generally governs and manages the user input and system output. There is no restriction on operating on any particular hardware arrangement and therefore the basic hardware depicted may easily be substituted for improved hardware or firmware arrangements as they are developed.

One or more parts of the example computing device 800, up to and including the entire computing device 800, can be virtualized. For example, a virtual processor can be a software object that executes according to a particular instruction set, even when a physical processor of the same type as the virtual processor is unavailable.

Numerous examples are provided herein to enhance understanding of the present disclosure. A specific set of examples are provided as follows. In a first example a rotary drilling system is disclosed that includes a housing incorporable as a portion of a drill string and having an anchorable exterior portion; a drag member coupled to the anchorable exterior portion of the housing and radially movable relative to the housing by a biasing member radially urging the drag member toward an outwardly deployed position; a force sensor coupled to the biasing member for sensing a force in the biasing member corresponding to a radially extended position of the drag member relative to the housing; and a controller communicatively coupled with the force sensor for receiving a signal from the force sensor representative of the sensed force in the biasing member and determining a borehole dimensional characteristic based on the signal.

In a second example, there is disclosed herein the rotary drilling system according to the first example, further including a drill bit and a rotary steerable drilling device capable of establishing a deflection angle and azimuthal toolface direction of the drill bit.

In a third example, there is disclosed herein the rotary drilling system according to the first or second examples, wherein the rotary steerable drilling device comprises the housing and drag member, wherein the drag member is radially deployable across a borehole annulus formed between the housing and a borehole wall.

In a fourth example, there is disclosed herein the rotary drilling system according to any of the preceding examples first to the third, further including a drilling shaft rotatably supported in the housing and urging rotation of the housing and the drag member.

In a fifth example, there is disclosed herein the rotary drilling system according to any of the preceding examples first to the fourth, wherein the drag member is one of a plurality of drag members, each of which has a wheel-shape and is oriented to roll parallel to a longitudinal centerline of the housing.

In a sixth example, there is disclosed herein the rotary drilling system according to any of the preceding examples first to the fifth, wherein the biasing member comprises a spring.

In a seventh example, there is disclosed herein the rotary drilling system according to any of the preceding examples first to the sixth, wherein the controller is programmed to determine a degree of compression of the spring and a corresponding radially extended position of the biasing member relative to the housing.

In an eighth example, there is disclosed herein the rotary drilling system according to any of the preceding examples first to the seventh, wherein the controller is programmed to determine a depth of borehole wall penetration by the drag member.

In a ninth example, there is disclosed herein the rotary drilling system according to any of the preceding examples first to the eighth, wherein the controller is programmed to determine a depth of borehole wall penetration by the drag member based on a known borehole wall formation hardness characteristic.

In a tenth example, there is disclosed herein the rotary drilling system according to any of the preceding examples first to the ninth, wherein the borehole wall formation hardness characteristic is derived from lithology logging data.

In an eleventh example, there is disclosed herein the rotary drilling system according to any of the preceding examples first to the tenth, wherein the controller is programmed to determine at least one of borehole radius and borehole diameter.

In an twelfth example, there is disclosed herein the rotary drilling system according to any of the preceding examples first to the eleventh, wherein the controller is programmed to determine a borehole shape.

In a thirteenth example, there is disclosed herein a method for determining a dimensional characteristic of a borehole extending into a subterranean formation including receiving, by a controller, a signal representative of a force in a biasing member corresponding to a radially extended position of a drag member relative to a housing to which the drag member is movably coupled and which is incorporated as a portion of a rotary drilling system extending into a borehole in a subterranean formation; and determining, by the controller, a dimensional characteristic of the borehole based on the received signal.

In a fourteenth example, there is disclosed herein the method according to the thirteenth example, further including positioning, in the borehole, the rotary drilling system comprising the housing and including an anchorable exterior portion and an anti-rotation device that comprises the drag member; resiliently biasing the drag member into engagement against a borehole wall of the borehole; detecting, by a force sensor, the force in the biasing member corresponding to a radially extended position of the drag member relative to the housing; and transmitting, to the controller communicatively coupled to the force sensor, the signal representative of the detected force in the biasing member.

In a fifteenth example, there is disclosed herein the method according to the thirteenth or fourteenth example, wherein the drag member comprises a spring.

In a sixteenth example, there is disclosed herein the method according to any of the preceding examples thirteenth to the fifteenth, wherein determining the dimensional characteristic of the borehole comprises determining a degree of compression of the spring of the drag member.

In a seventeenth example, there is disclosed herein the method according to any of the preceding examples thirteenth to the sixteenth, wherein determining the dimensional characteristic of the borehole comprises determining a radially extended position of the drag member in dependence upon the determined degree of compression of the spring of the drag member.

In a eighteenth example, there is disclosed herein the method according to any of the preceding examples thirteenth to the seventeenth, wherein the determination of the dimensional characteristic of the borehole corrects for a depth of penetration of the deployed drag member into the borehole wall.

In a nineteenth example, there is disclosed herein the method according to any of the preceding examples thirteenth to the eighteenth, wherein the depth of penetration of the deployed drag member into the borehole wall is determined based on a borehole wall formation hardness characteristic.

In a twentieth example, there is disclosed herein the method according to any of the preceding examples thirteenth to the nineteenth, wherein the borehole wall formation hardness characteristic is maintained as part of lithology logging data.

The embodiments shown and described above are only examples. Many details are often found in the art such as the other features of a rotary steerable drilling systems, and particularly anti-rotation devices used in such systems. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

What is claimed is:

1. A rotary drilling system, comprising:
a housing incorporable as a portion of a drill string and having an anchorable exterior portion;
a plurality of drag members that act as an anti-rotation device and are coupled to the anchorable exterior portion of the housing and radially movable relative to the housing by a biasing member radially urging the plurality of drag members toward an outwardly deployed position, wherein each drag member is spaced equidistant from one another about the housing;
a force sensor coupled to the biasing member for sensing a force in the biasing member corresponding to a radially extended position of the drag member relative to the housing; and
a controller communicatively coupled with the force sensor for receiving a signal from the force sensor representative of the sensed force in the biasing member, determining a depth of borehole wall penetration by the drag member based on a known borehole wall formation hardness characteristic determined while drilling, and determining a borehole dimensional characteristic based on the signal and the depth of the borehole wall penetration by the plurality of drag members, wherein an accuracy of the borehole dimensional characteristic is based on a number of the plurality of drag members.

2. The rotary drilling system of claim 1, further comprising a drill bit and a rotary steerable drilling device capable of establishing a deflection angle and azimuthal toolface direction of the drill bit.

3. The rotary drilling system of claim 2, wherein the rotary steerable drilling device comprises the housing and plurality of drag members, wherein each drag member is radially deployable across a borehole annulus formed between the housing and a borehole wall.

4. The rotary drilling system of claim 3, further comprising a drilling shaft rotatably supported in the housing and urging rotation of the housing and each drag member.

5. The rotary drilling system of claim 4, wherein each of the plurality of drag members has a wheel-shape and is oriented to roll parallel to a longitudinal centerline of the housing.

6. The method of claim 3, wherein the borehole wall formation hardness characteristic is maintained as part of lithology logging data.

7. The rotary drilling system of claim 1, wherein the biasing member comprises a spring.

8. The rotary drilling system of claim 7, wherein the controller is programmed to determine a degree of compression of the spring and a corresponding radially extended position of the biasing member relative to the housing.

9. The rotary drilling system of claim 1, wherein the borehole wall formation hardness characteristic is derived from lithology logging data.

10. The rotary drilling system of claim 1, wherein the controller is programmed to determine at least one of borehole radius and borehole diameter.

11. The rotary drilling system of claim 1, wherein the controller is programmed to determine a borehole shape.

12. A method for determining a dimensional characteristic of a borehole extending into a subterranean formation comprising:
receiving, by a controller, a signal representative of a force in a biasing member corresponding to radially extended positions of a plurality of drag members that act as an anti-rotation device and are relative to a housing to which the drag member is movably coupled and which is incorporated as a portion of a rotary drilling system extending into a borehole in a subterranean formation, wherein each drag member is spaced equidistant from one another about the housing; and
determining, by the controller, the dimensional characteristic of the borehole based on a depth of penetration of the deployed drag member into the borehole wall that is determined based on a borehole wall formation hardness characteristic determined while drilling and the received signal, an accuracy of the borehole dimensional characteristic based on a number of the plurality of drag members.

13. The method of claim 12, further comprising:
positioning, in the borehole, the rotary drilling system comprising the housing and including an anchorable exterior portion and the plurality of drag members that act as an anti-rotation device;
resiliently biasing the plurality of drag members into engagement against a borehole wall of the borehole;
detecting, by a force sensor, the force in the biasing member corresponding to each radially extended position of the corresponding drag member relative to the housing; and
transmitting, to the controller communicatively coupled to the force sensor, the signal representative of the detected force in the biasing member.

14. The method of claim 13, wherein each drag member comprises a spring.

15. The method of claim 14, wherein determining the dimensional characteristic of the borehole comprises determining a degree of compression of the spring of each drag member.

16. The method of claim 15, wherein determining the dimensional characteristic of the borehole comprises determining each radially extended position of the corresponding drag member in dependence upon the determined degree of compression of the spring of the corresponding drag member.

* * * * *